United States Patent
Sahashi et al.

Patent Number: 5,428,289
Date of Patent: Jun. 27, 1995

[54] APPARATUS FOR DETECTING THE ROTATING SPEED OF A WHEEL

[75] Inventors: Koji Sahashi, Inabe; Eiji Funahashi, Iwata, both of Japan

[73] Assignee: NTN Corporation, Osaka, Japan

[21] Appl. No.: 783,675

[22] Filed: Oct. 29, 1991

[30] Foreign Application Priority Data

Oct. 31, 1990 [JP] Japan .............. 2-115042 U
Oct. 31, 1990 [JP] Japan .............. 2-115043 U

[51] Int. Cl.6 .............. G01P 3/48; G01P 3/54; G01B 7/14; F16C 32/00
[52] U.S. Cl. .............. 324/173; 324/207.25; 384/448
[58] Field of Search .............. 324/173, 174, 207.11, 324/207.13, 207.22, 207.25; 310/168, 68 B; 384/448

[56] References Cited

U.S. PATENT DOCUMENTS

| 4,940,936 | 7/1990 | Grillo et al. | 324/174 |
| 5,143,458 | 9/1992 | Alff et al. | 384/448 |

FOREIGN PATENT DOCUMENTS

| 0250275 | 12/1987 | European Pat. Off. |
| 0371836 | 6/1990 | European Pat. Off. |
| 0378939A1 | 7/1990 | European Pat. Off. |
| 0453331A1 | 10/1991 | European Pat. Off. |
| 3814921A1 | 11/1988 | Germany |
| 3819619A1 | 2/1989 | Germany |
| 3809904A1 | 10/1989 | Germany |

Primary Examiner—Walter E. Snow
Attorney, Agent, or Firm—Nikaido, Marmelstein, Murray & Oram

[57] ABSTRACT

A detector for detecting the rotating speed of a wheel bearing having a pulser ring mounted between bearing rings of a wheel bearing at one end thereof. One of the bearing rings is adapted to rotate together with a wheel and the other is fixed. A ring is provided axially outside of the pulser ring and press-fitted on the fixed bearing ring. A rotating speed sensor is mounted on the ring and has a detecting portion inserted in a hole formed in the ring. A seal member is provided in the space between the ring and the rotatable bearing ring to seal the space. In another arrangement, the ring is mounted on the fixed one of the bearing rings and the detected portion of the pulser ring is located opposite to the detecting portion of the rotating speed sensor with a radial gap defined therebetween.

3 Claims, 5 Drawing Sheets

APPARATUS FOR DETECTING THE ROTATING SPEED OF A WHEEL

This invention relates to a device for detecting the rotating speed of a wheel bearing supporting a wheel of an automobile.

An automobile equipped with an antilock brake system has a pulser ring mounted on an outer periphery of an outer ring of a bearing rotatably supporting a driven wheel and a rotating speed sensor mounted on a fixed portion such as an axle so as to face the outer periphery of the pulser ring, in order to detect the rotating speed of the wheel.

In such an arrangement, the pulser ring and the rotating speed sensor are both exposed to the outside of the automobile. Thus, while it is running, stones and sands will hit them or muddy or salty water will infiltrate. This may damage the function of the pulser ring and the rotating speed sensor and may also rust and corrode them.

It is an object of this invention to provide a rotating speed detector which obviates the abovesaid shortcomings.

In accordance with the present invention, there is provided a device for detecting the rotating speed of a wheel bearing having bearing rings, one of the bearing rings being rotatable with the wheel of a vehicle and the other being fixed, comprising a pulser ring having a detected portion and mounted on the rotatable bearing ring of the wheel bearing at one end thereof, a ring provided axially outside of the pulser ring and formed with a hole, a rotating speed sensor having a detecting portion inserted in the hole formed in the ring, and a seal member provided in the space between the ring and the rotatable one of the bearing rings to seal the space.

In accordance with another embodiment of the present invention, the ring is disposed between the bearing rings and mounted on the fixed one of the bearing rings, the detected portion of the pulser ring being opposed to the detecting portion of the rotating speed sensor with a radial gap defined therebetween.

According to this invention, as the rotatable bearing ring begins to rotate together with the wheel, the pulser ring mounted on the rotatable bearing ring also rotates. The rotating speed sensor detects cyclical magnetic variations produced by the rotating pulser ring and thus the rotating speed of a wheel bearing.

The ring and the seal member serve to shut off the detecting portion of the rotating speed sensor and the pulser ring from outside and protect them from being hit by stones and against rusting and corrosion. This assures high detecting function.

Other features and objects of the present invention will become apparent from the following description taken with reference to the accompanying drawings, in which:

FIGS. 1-3 show the first embodiment according to this invention.

Figure 1:
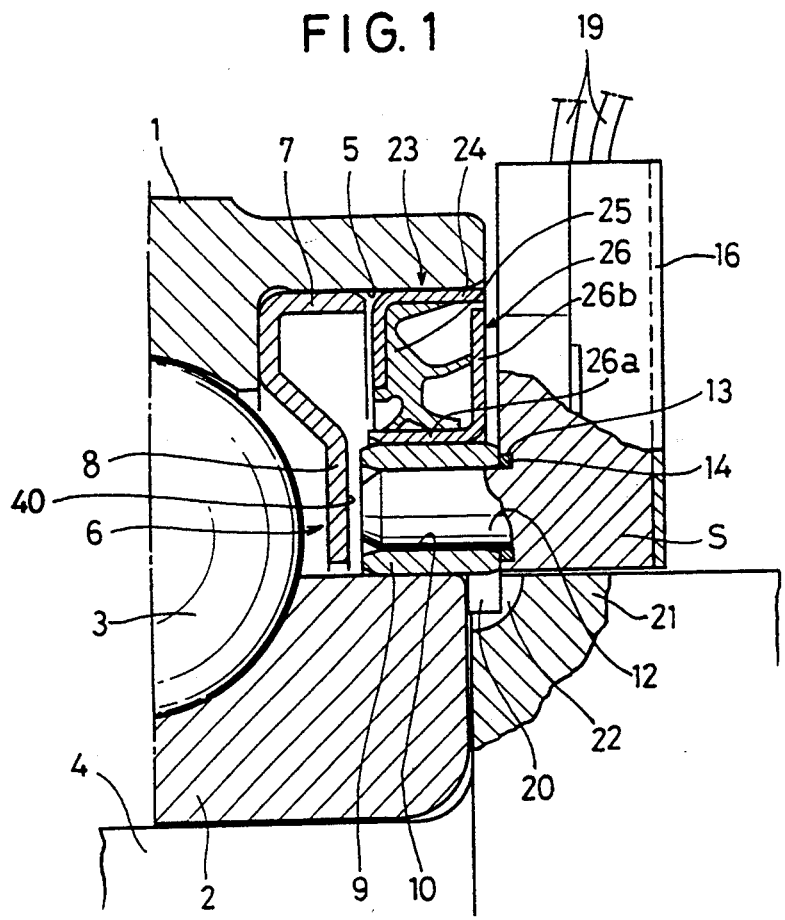
FIG. 1 is a sectional view of the first embodiment according to this invention.

FIG. 1 shows a wheel bearing for supporting a driven wheel of an automobile. It comprises a rotatable outer ring 1, an inner ring 2 and rolling elements 3 mounted between the rings 1 and 2. The driven wheel is supported by the outer ring 1 while the inner ring 2 is supported on a stationary axle 4.

The outer ring 1 has a recessed portion 5 in the inner periphery thereof at one end. A pulser ring 6 is mounted in the recessed portion 5.

The pulser ring 6 comprises a cylindrical portion 7 and a flange portion 8 having a detected portion 40. The cylindrical portion 7 is press-fitted in the recessed portion 5 against its inner peripheral surface. N and S poles are arranged circumferentially so as to alternate with each other on the detected portion 40 i.e. on the outer surface of the flange 8 facing the sensor S.

Figure 3:
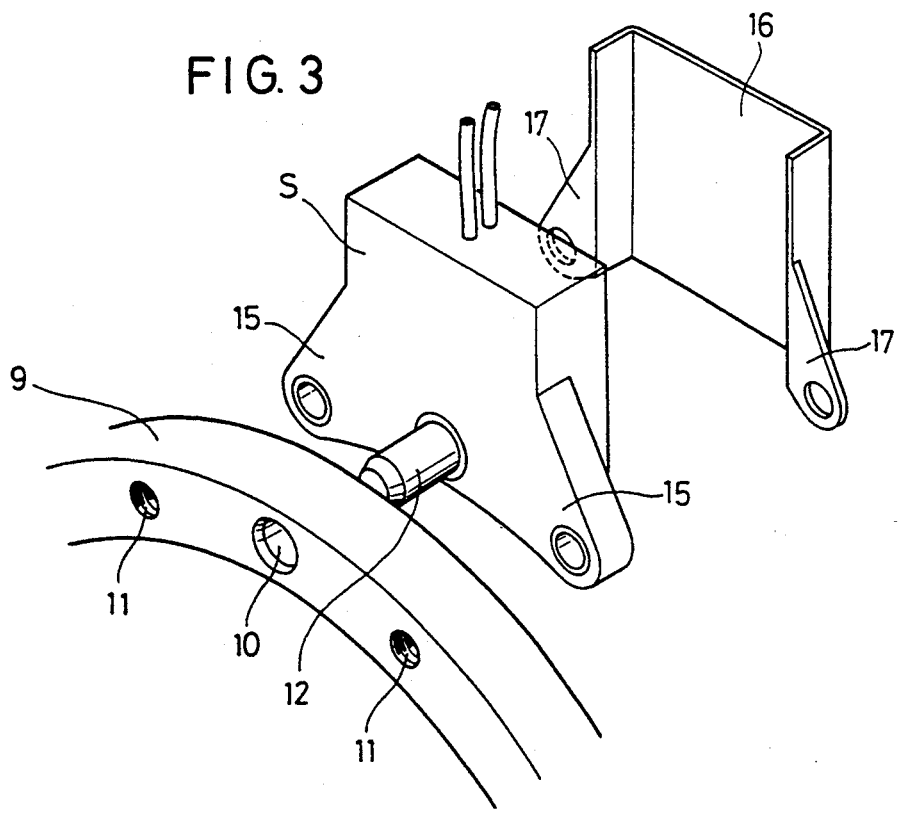
FIG. 3 is an exploded perspective view of the mounting portion.

Axially outwardly of the flange 8, there is provided a ring 9 press-fitted on the outer periphery of the inner ring 2 at one end thereof. As shown in FIG. 3, the ring 9 is formed with a hole 10 and a pair of threaded holes 11. A detecting portion 12 of a rotating speed sensor S is inserted in the hole 10. In order to prevent infiltration of water into the bearing through the hole 10, an annular groove 13 is formed in the detecting portion 12 of the rotating speed sensor S at the root thereof and an O-ring 14 is fitted therein and pressed against the outer end of the ring 9.

Figure 2:
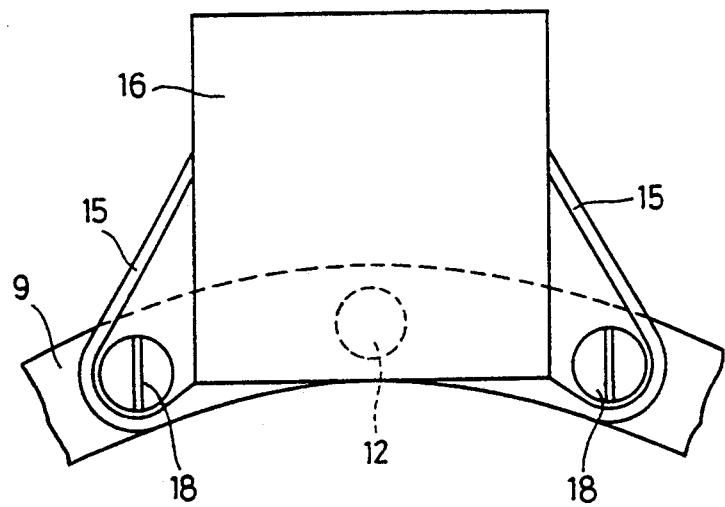
FIG. 2 is a front view of the mounting portion of the rotating speed sensor of the same.

As shown in FIGS. 2 and 3, the rotating speed sensor S has a pair of mounting legs 15 at both sides. The mounting legs 15 and mounting legs 17 provided at both sides of a cover 16 covering the Front side of the rotating speed sensor S are fixed in position by tightening bolts 18 threaded into the threaded holes 11.

The rotating speed sensor S contains a magnetic sensitive element such as a Hall element or an MR element to detect magnetic variations in response to the rotation of the pulser ring 6.

If the ring 9 supporting the rotating speed sensor S should rotate relative to the inner ring 2 due to creeping, fixed harnesses 19 (FIG. 1) extending from the rotating speed sensor S might be broken. In order to prevent such trouble, the ring 9 is provided on the inner peripheral surface thereof with a protrusion 20 which is engaged in a cutout 22 formed in a shoulder portion 21 of the axle 4.

A seal member 23 is disposed between the outer peripheral surface of the ring 9 and the inner periphery of the recess in the outer ring 1.

The seal member 23 comprises a core bar 24 having a sectional shape of the letter L and press-fitted against the inner periphery of the recess 5 and a resilient seal 25 integral with the core bar 24. The resilient seal 25 is held in contact with a seal ring 26 press-fitted against the outer peripheral surface of the ring 9, thus preventing debris and rain water from infiltrating into the bearing. The seal ring 26 has an L-shaped section comprising a cylindrical portion 26a press-fitted against the outer peripheral surface of the ring 9 and a flange 26b extending outwardly from one end of the cylindrical portion 26a. The outer edge of the flange 26b is disposed near a cylindrical portion of the core bar 24, forming a labyrinth therebetween.

The outer end of the bearing is closed by a cover secured to the other end of the outer ring 1 to prevent debris and rain water from infiltrating into the bearing.

In the above embodiment, as the wheel begins to rotate, the outer ring 1 fixedly mounted on the wheel and the pulser ring 6 secured to the outer ring 1 will also rotate. The rotating speed sensor S detects magnetic variations which represent the rotating speed.

Figure 4:
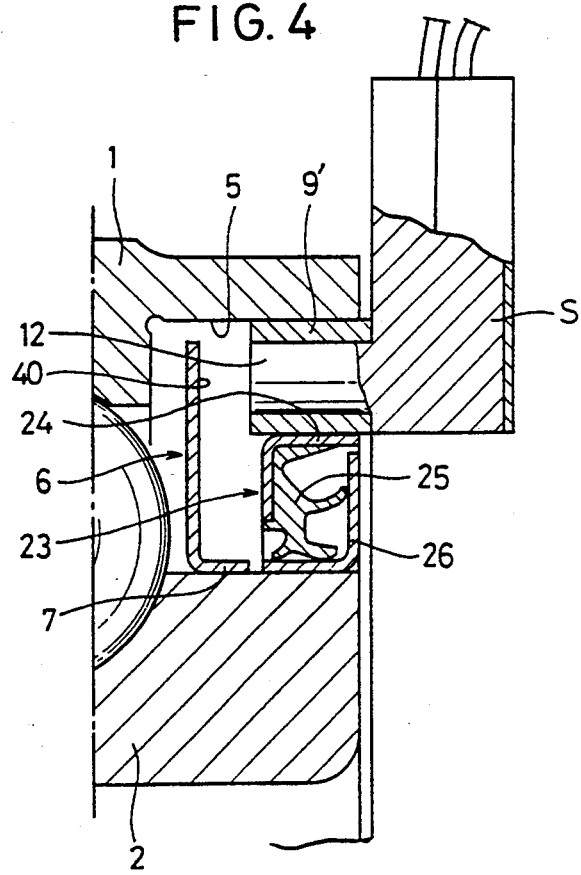
FIG. 4 is a sectional view of the second embodiment.

FIG. 4 shows the second embodiment of the rotating speed detector according to this invention. In this embodiment, the inner ring of the bearing is adapted to rotate. The pulser ring 6 has its cylindrical portion 7 press-fitted against the outer peripheral surface of the inner ring 2 supporting a wheel. A ring 9' supporting the sensor S is press-fitted against the inner peripheral surface of the recess 5 in the outer ring 1. The seal member 23 has its core bar 24 press-fitted against the inner peripheral surface of the ring 9' and its resilient seal 25 pressed against the seal ring 28 which is press-fitted against the outer peripheral surface of the inner ring 2, thus shutting off the pulser ring 6 and the detecting portion of the rotating speed sensor S from outside.

Figure 5:
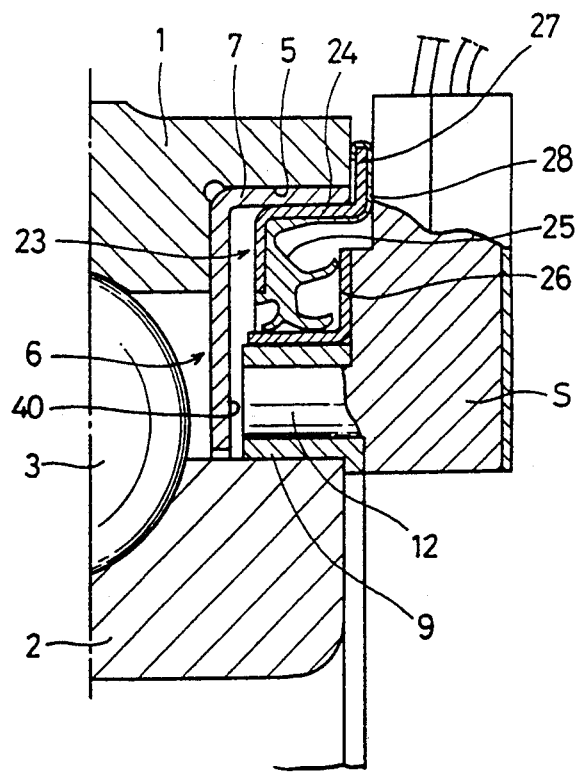
FIG. 5 is a sectional view of the third embodiment.

FIG. 5 shows the third embodiment of the rotating speed detector according to this invention. In this embodiment, the seal member 23 has its core bar 24 press-fitted against the inner peripheral surface of the recess 5 in the outer ring 1 and provided on the outer end thereof with an outwardly-extending flange 27. The resilient seal 25 integral with the core bar 24 is provided with a covering portion 28 covering the surface of the flange 27. The covering portion 28 is pressed against the outer ring 1 to provide a seal at the contact portion therewith.

FIGS. 6-9 show the fourth embodiment of the rotating speed detector according to this invention.

Figure 6:
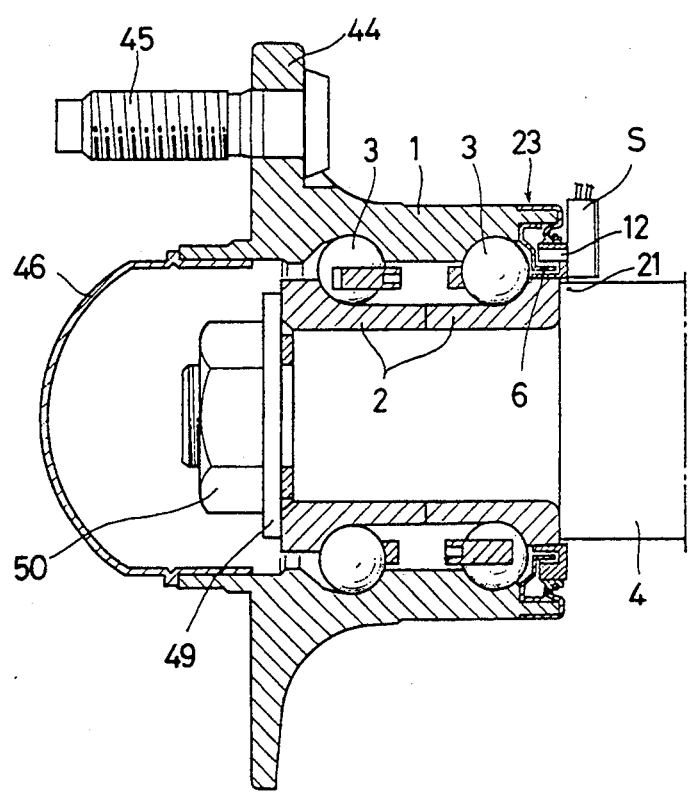
FIG. 6 is a sectional view of the fourth embodiment.

FIG. 6 shows a wheel bearing of the type in which the outer ring is adapted to rotate and which supports a driven wheel of an automobile. This wheel bearing comprises an outer ring 1 as a bearing ring at the rotary side and a pair of inner rings 2 as driving rings at the fixed side and rolling elements 3 disposed between the rings 1 and 2.

The outer ring 1 is provided at the outer end thereof with a flange 44. A wheel (not shown) is mounted on the flange 44 by means of bolts 45. A cap 46 is fitted on the outer ring 1 at the outer end thereof to prevent debris from infiltrating into the bearing.

On the other hand, the inner rings 2 are fitted on the outer periphery of an axle 4 with the inner end thereof pressed against a shoulder portion 21 of the axle 4 and the inner end thereof axially urged by a nut 50 through a washer 49.

Figure 7:
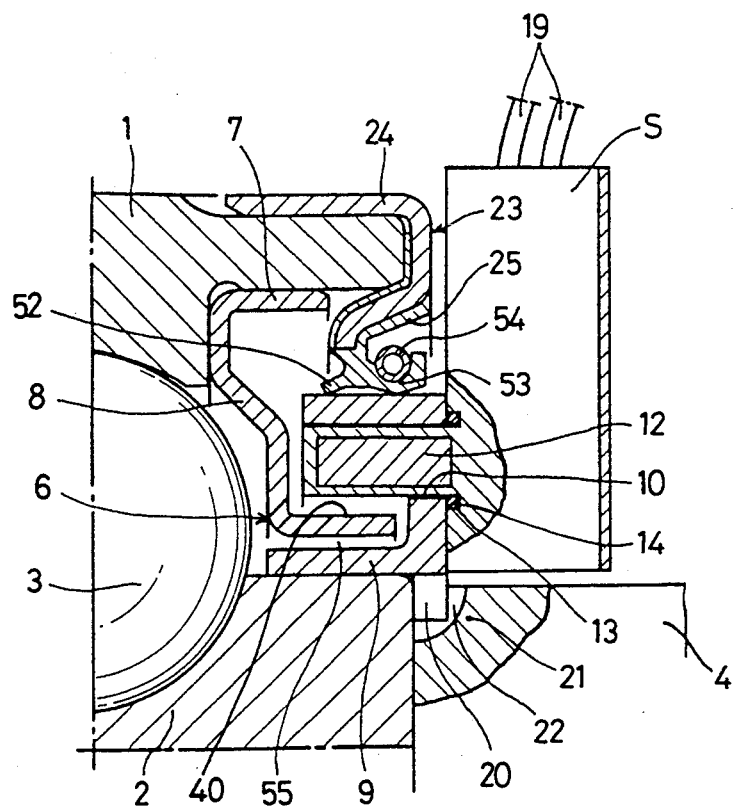
FIG. 7 is an enlarged sectional view of a portion of the same.

FIG. 7 shows in more detail the inner end of the wheel bearing of this embodiment. A ring 9 is press-fitted on the outer peripheral surface of the inner ring 2. The space between the inner end of the ring 9 and that of the outer ring 1 is sealed by a seat member 23.

The seal member 23 comprises a core bar 24 enclosing the inner end of the outer ring 1 and a resilient seal 25 integrally provided at the inner end of the core bar 24. At the inner end of the resilient seal 25, a lip 52 and a cylindrical portion 53 are provided. A garter spring 54 is pressed against the inner end of the cylindrical portion 53, thus pressing this portion against the outer peripheral surface of the ping 9. The lip 52 presses against the outer peripheral surface of the ring 9 with its own resilience.

Figure 9:
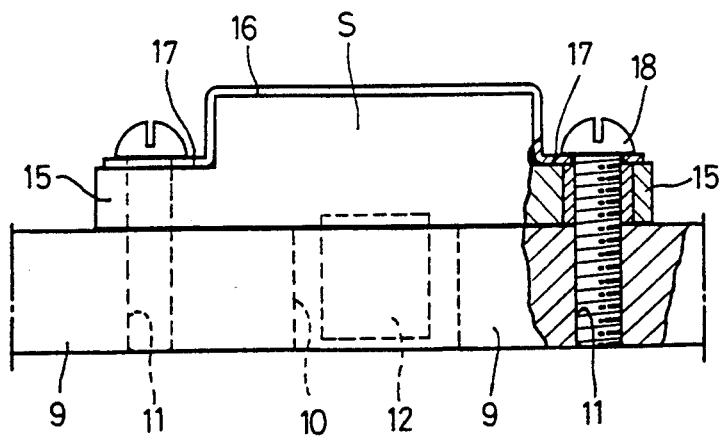
FIG. 9 is a partially cut-away bottom view of FIG. 8.

The ring 9 is formed with an annular groove 55 in its inner peripheral surface. As shown in FIG. 9, the ring 9 is formed with an insertion hole 10 and a pair of threaded holes 11. The insertion hole 10 communicates with the outer peripheral side of the annular groove 55. A detecting portion 12 of a rotating speed sensor S is inserted in the insertion hole 10. In order to prevent rainwater from infiltrating into the bearing through this insert portion, a seal groove 13 is formed in the detecting portion 12 at the root thereof and an O-ring 14 is fitted in the seal groove 13 and pressed against the outer peripheral surface of the ring 9.

Figure 8:
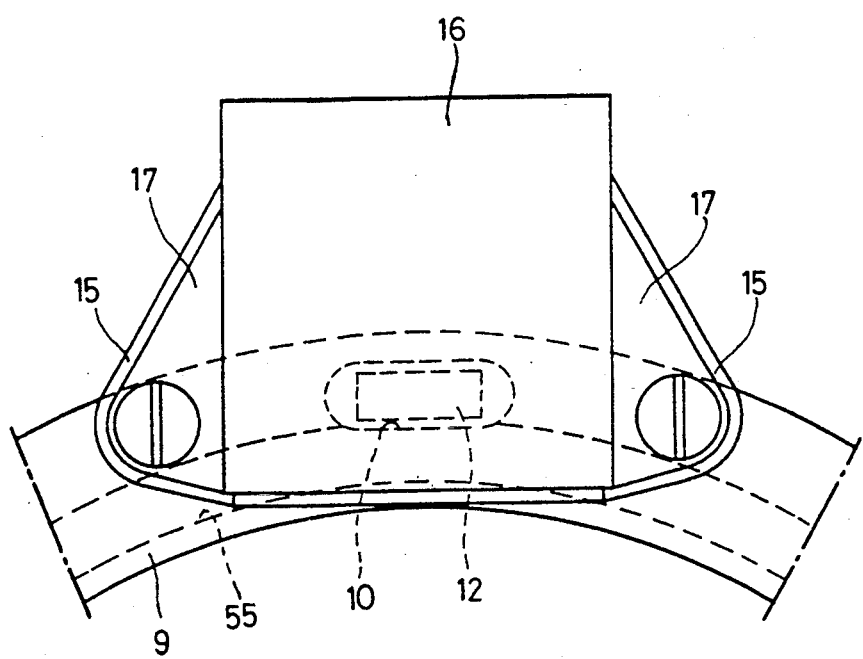
FIG. 8 is a side view of the same.

As shown in FIGS. 8 and 9, the rotating speed sensor S has a pair of mounting legs 15 at both sides. The mounting legs 15 and mounting legs 17 provided at both sides of a cover 16 covering the front side of the rotating speed sensor S are fixed in position by tightening bolts 18 inserted in the threaded holes 11.

The detected portion 40 of the pulser ring 6 is mounted in the annular groove 55 in the ring 9. A radial gap is formed between the outer peripheral surface of the detected portion 40 of the pulser ring 6 and the detecting portion 12 of the sensor S.

The pulser ring 6 is provided at the inner end thereof with an outwardly extending flange 8. Along the outer edge of the flange 8 is provided a cylindrical portion 7 which is press-fitted against the inner peripheral surface of the inboard side end of the outer ring 1.

The pulser ring 6 is in the form of a polyphase magnet having N and S poles arranged so as to circumferentially alternate with each other. On the other hand, the rotating speed sensor S contains a magnetic sensitive element such as a Hall element or an MR element to detect magnetic variations which represent the rotating speed of the pulser ring 6.

If the ring 9 supporting the rotating speed sensor S should rotate relative to the inner ring 2 due to creeping, harnesses 19 extending from the rotating speed sensor S might be broken. In order to prevent such trouble, as shown in FIG. 7, the ring 9 may be formed with a protrusion 20 which is engaged in a cutout 22 formed in a shoulder portion 21 of the axle 4. When providing such means for preventing a relative rotation, the inner rings 2 may be fitted loosely on the axle 4.

In operation, when the wheel begins to rotate, the outer ring 1 fixedly mounted thereto and the pulser ring 6 mounted on the outer ring 1 rotate. The rotating speed sensor S detects magnetic variations in accordance with the rotating speed.

Figure 10:
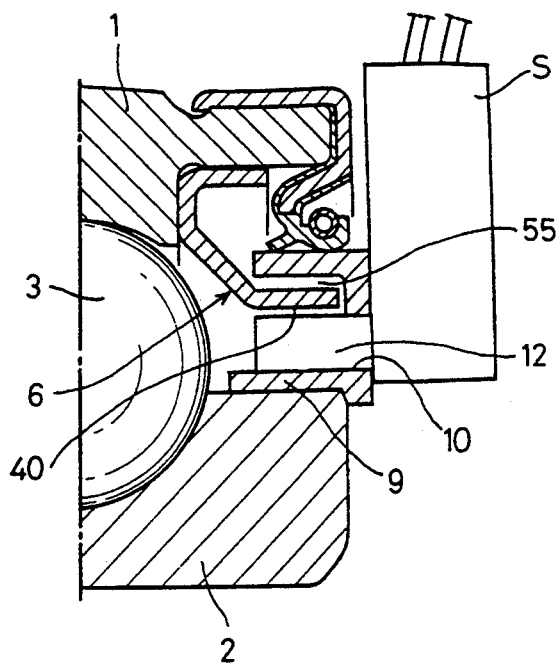
FIG. 10 is a sectional view of the fifth embodiment.

FIG. 10 shows the fifth embodiment of the rotating speed detector according to this invention. In this embodiment, a ring 9 press-fitted against the outer peripheral portion of the inner ring 2 at one end is formed with an insertion hole 10 which communicates with the inner peripheral portion of the annular groove 55. The detected portion of the pulser ring 6 is disposed at the outer peripheral side of the detecting portion 12 of the rotating speed sensor S inserted in the hole 10. Thus, in this embodiment, the detecting portion 12 and the detected portion 40 of the pulser ring 6 are positioned in a manner opposite to the arrangement of the fourth embodiment.

Figure 11:
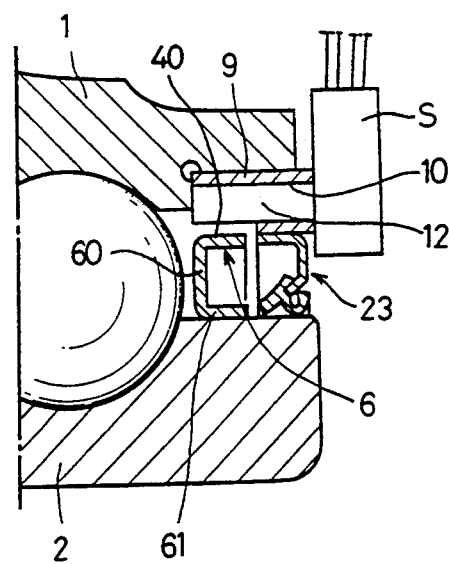
FIG. 11 is a sectional view of the sixth embodiment.

FIG. 11 shows the sixth embodiment of the rotating speed detector according to this invention. The wheel bearing of this embodiment is of the type in which the inner ring is adapted to rotate. A ring 9 supporting the rotating speed sensor S is press-fitted on the inner periphery of a fixed outer ring 1 at one end thereof. A seal member 23 is fitted between the inner peripheral surface of the ring 9 and the outer peripheral surface of the inner ring 2 at one end.

A pulser ring 6 is mounted inside of a detecting portion 12 of a rotating speed sensor S.

The pulser ring 6 is provided at its inner end with a flange 60. Along the inner edge of the flange 60, a cylindrical portion 61 is provided which is press-fitted against the outer peripheral surface of the inner ring 2 at its end.

In any of the above-described embodiments, the pulser ring is shown to be made up of a polyphase magnet but it may be of any other type. For example, a pulser detecting gear may be used to detect change in the magnetic field due to the rotation of the pulse detecting gear by use of the pulser ring.

What is claimed is:

1. A device for detecting the rotating speed of a wheel bearing having bearing rings, one of said bearing rings being rotatable with the wheel of a vehicle and the other being fixed, comprising a pulser ring having a detected portion and a cylindrical portion press-fitted on said rotatable bearing ring at one end thereof, a ring provided axially outside of said pulser ring and formed with a hole, a rotating speed sensor having a detecting portion inserted in said hole formed in said ring, and a seal member provided in the space between said ring and the rotatable one of said bearing rings to seal said space, said ring and said seal member being substantially located axially inside of the ends of said bearing rings.

2. A device as claimed in claim 1, wherein said ring is disposed between said bearing rings and mounted on the fixed one of said bearing rings, the detected portion of said pulser ring being opposed to said detecting portion of said rotating speed sensor with a radial gap defined therebetween.

3. A device for detecting the rotating speed of a wheel as recited in claim 1, wherein said pulser ring and said ring are provided parallel to each other, and on a same axis which is parallel to a rotating axis of the wheel of the vehicle.

* * * * *